Feb. 16, 1960     H. H. GOTBERG ET AL     2,925,019
BROACHING MACHINE
Filed March 1, 1957                                       7 Sheets-Sheet 2
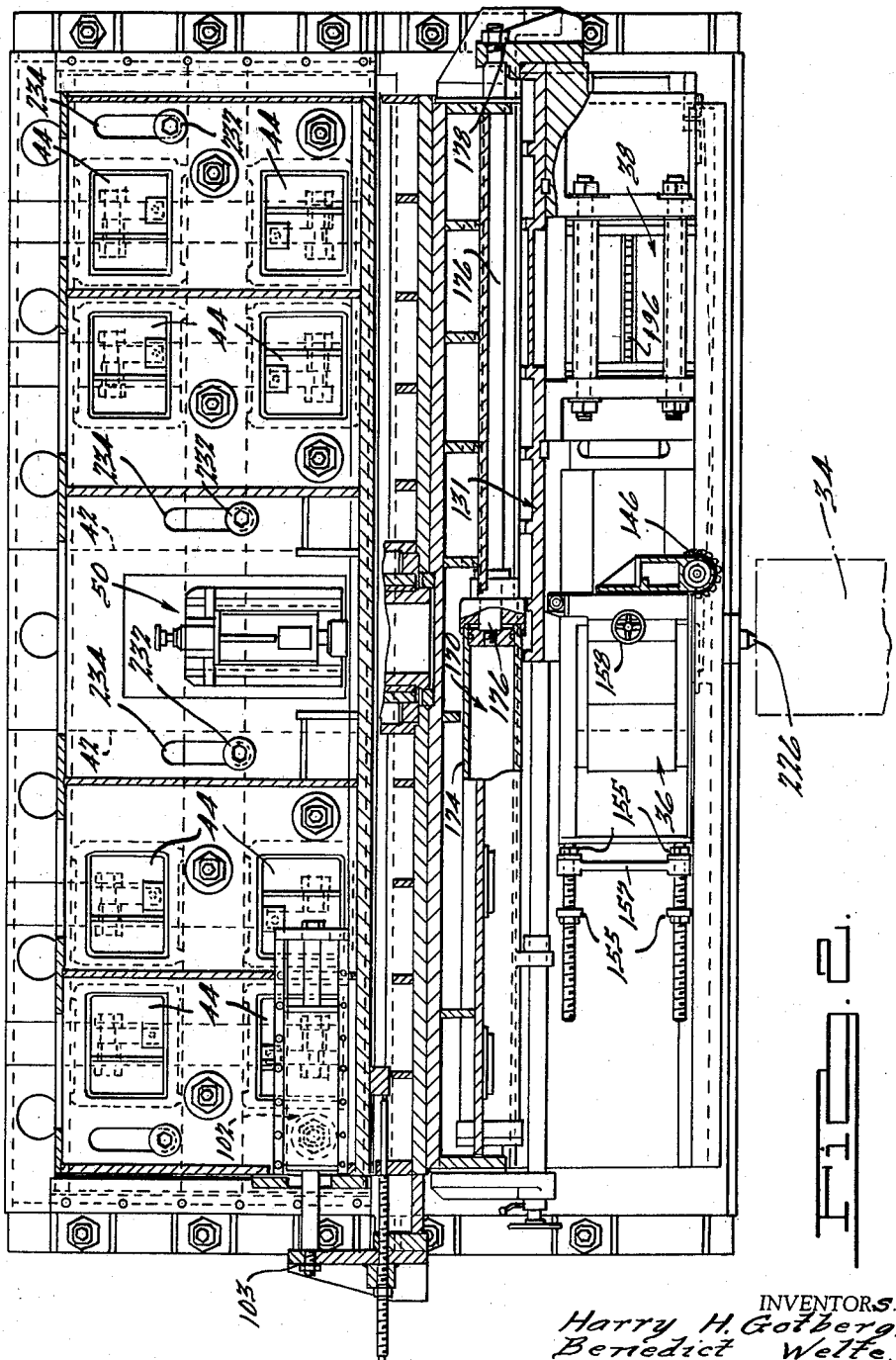
INVENTORS.
Harry H. Gotberg.
Benedict Welte.
BY
Harness, Dickey & Pierce.
ATTORNEYS.

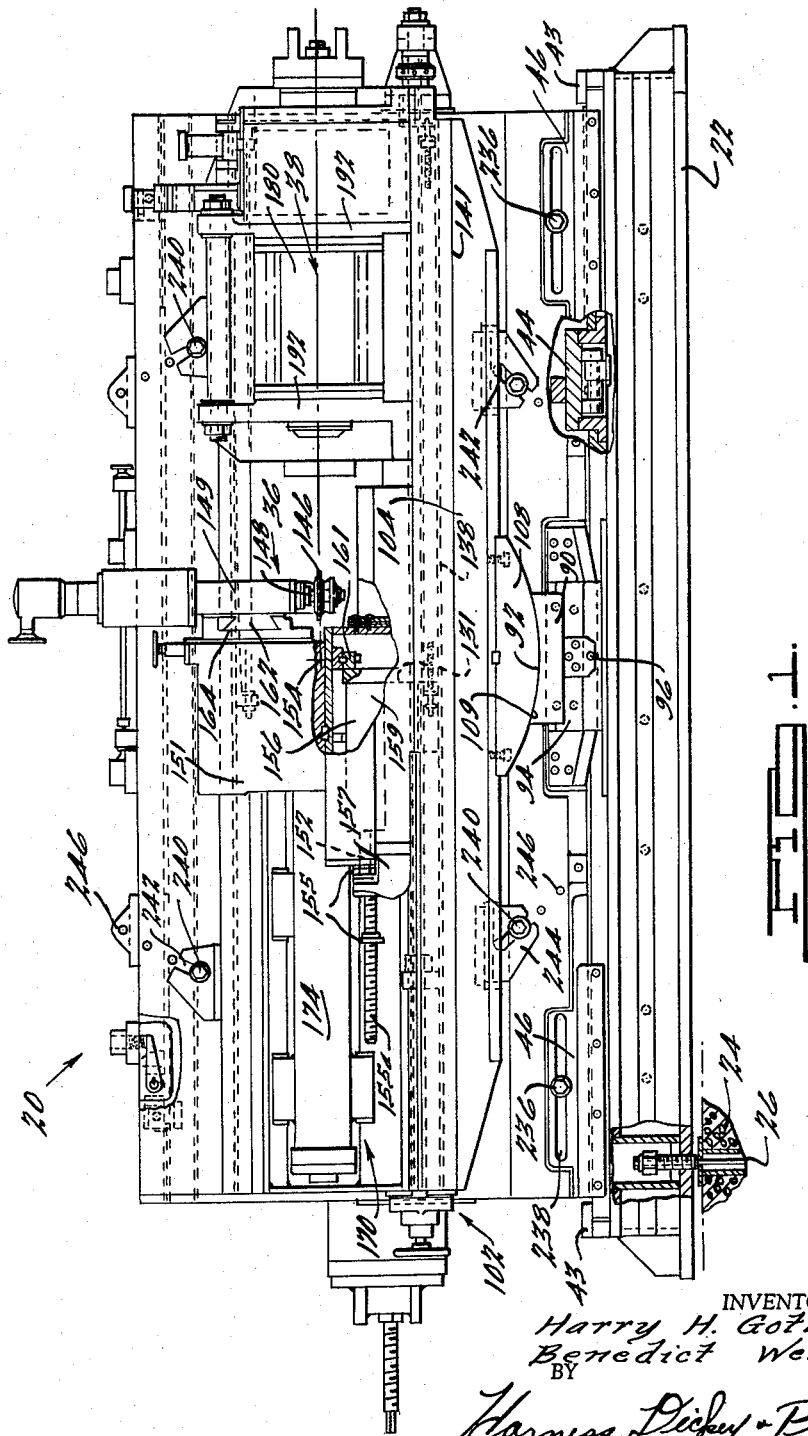

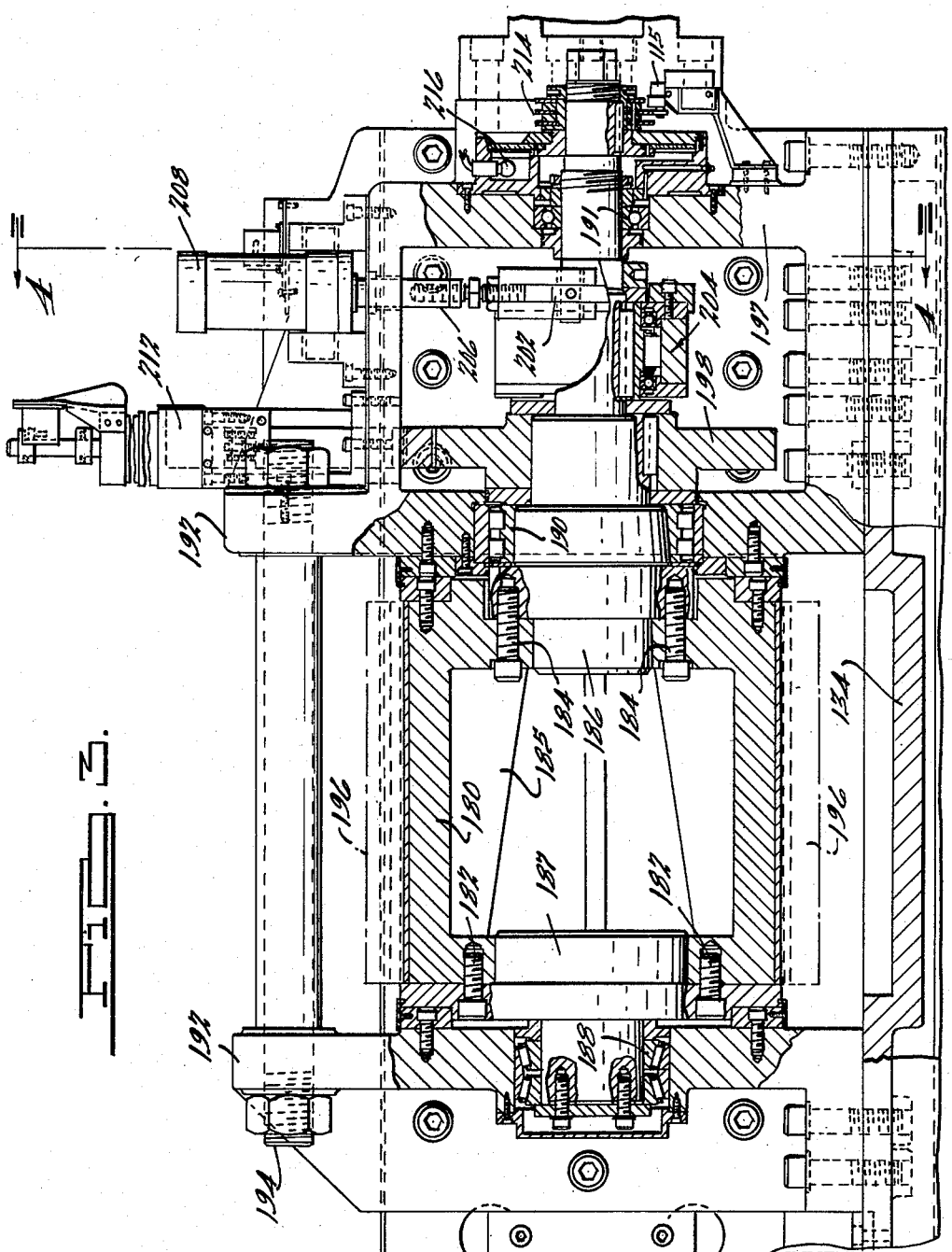

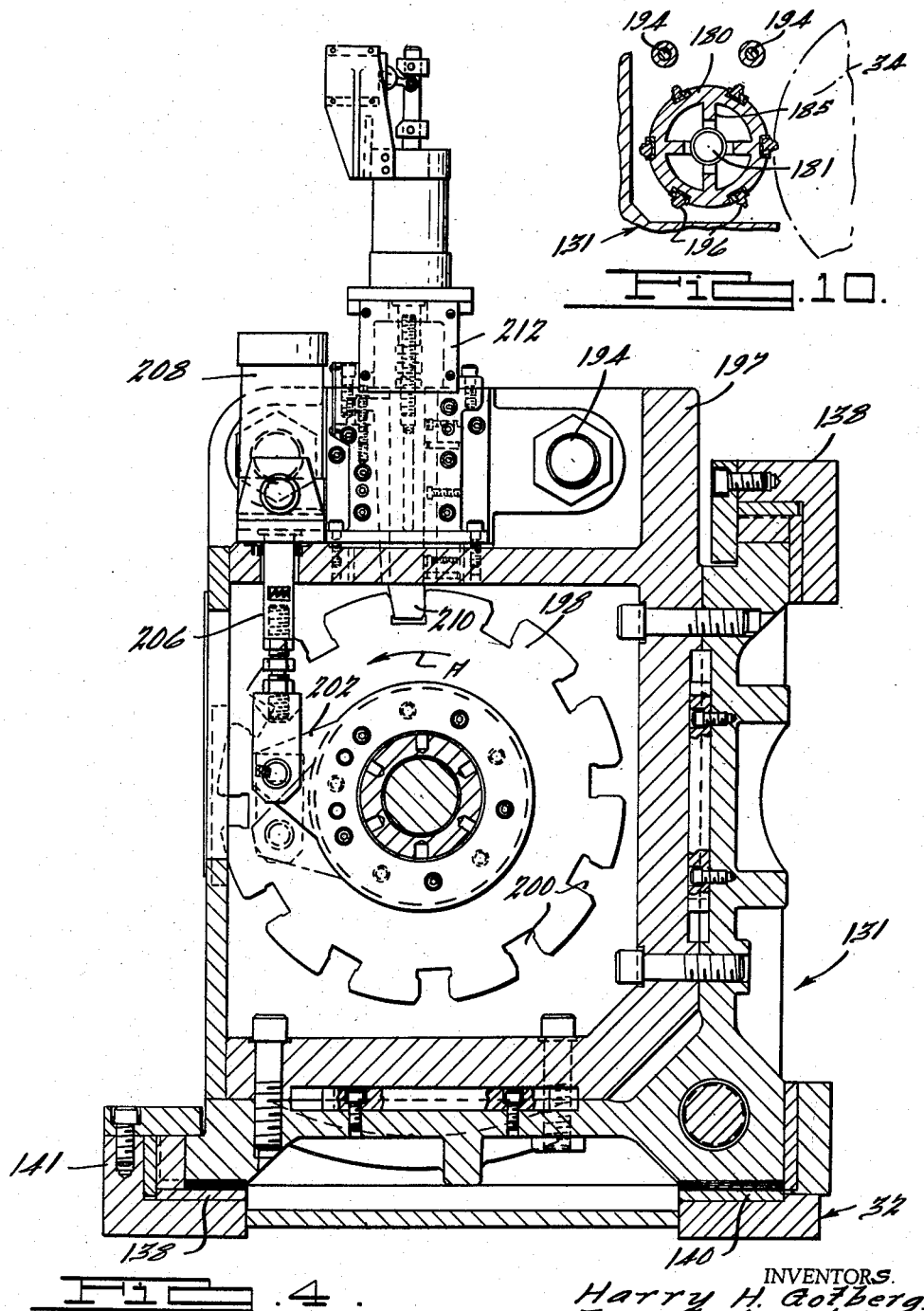

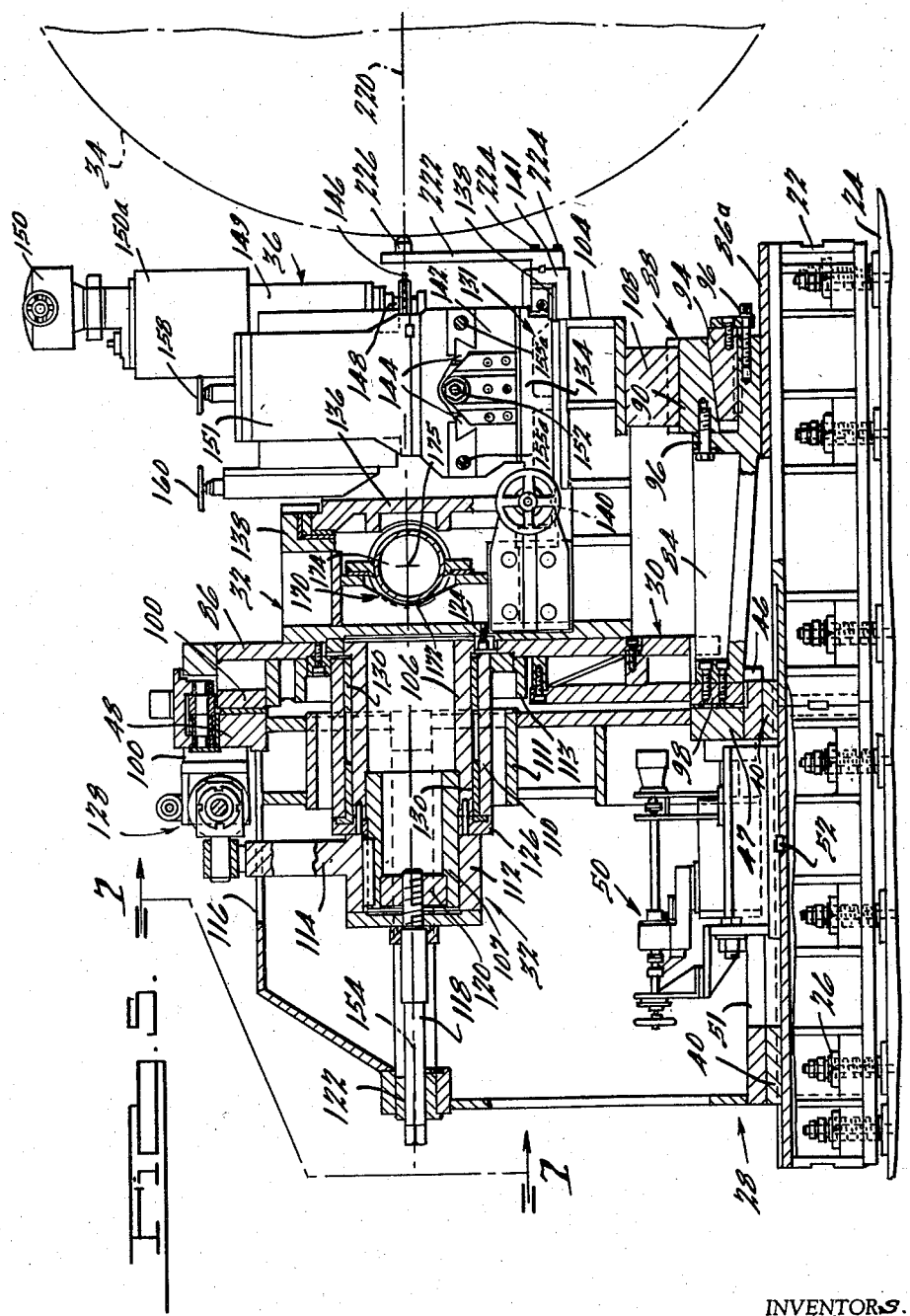

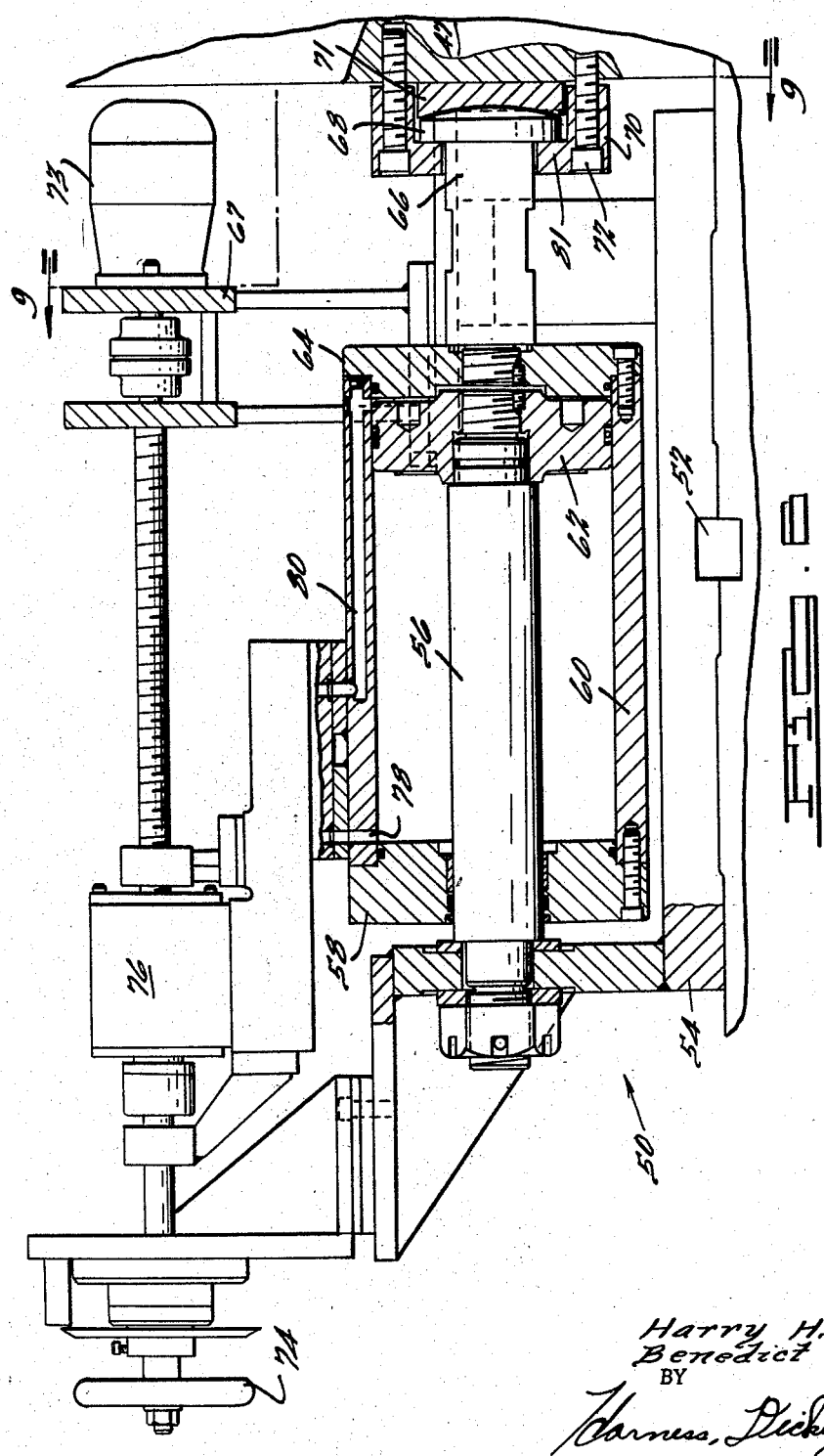

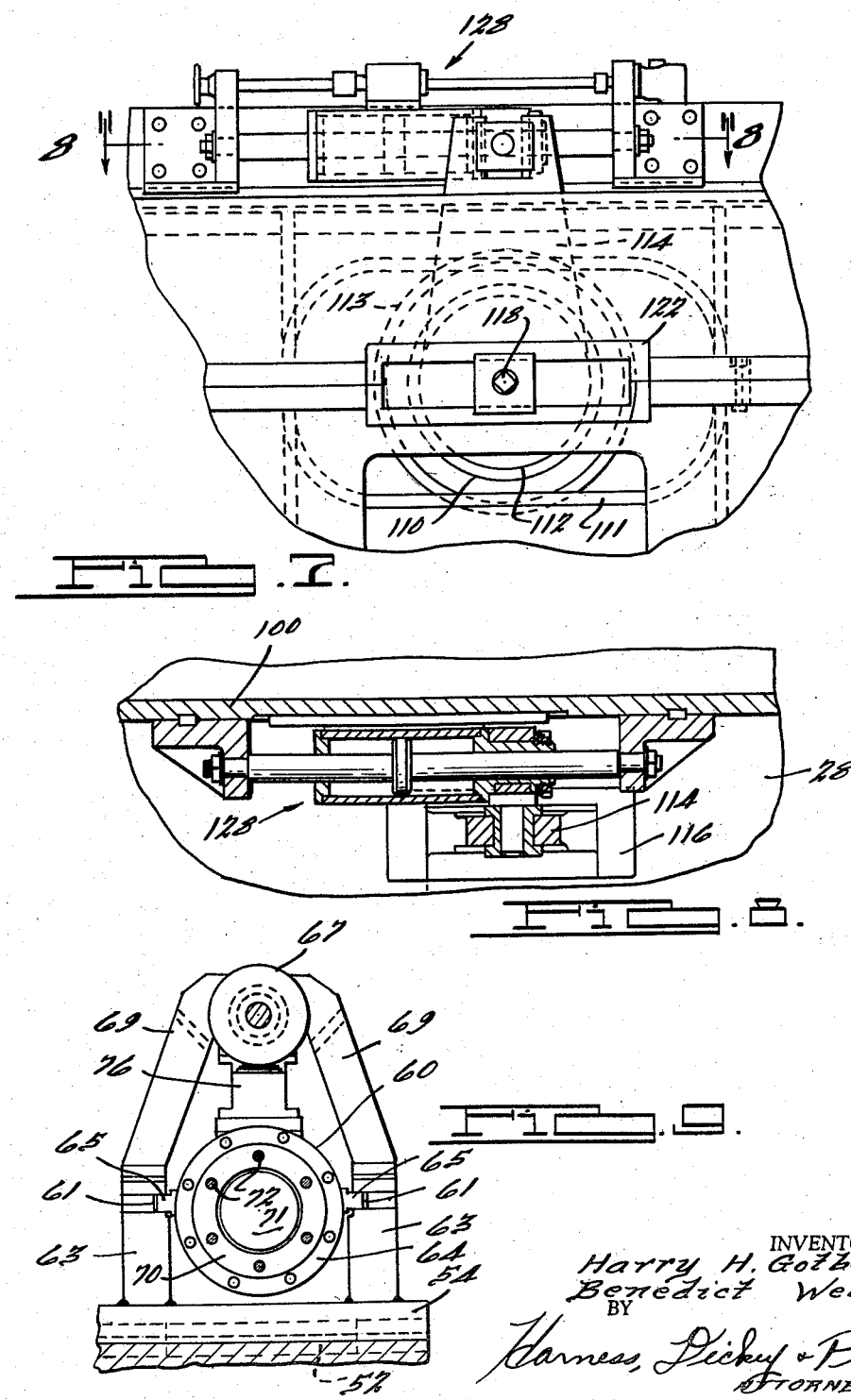

United States Patent Office 2,925,019
Patented Feb. 16, 1960

2,925,019
BROACHING MACHINE

Harry H. Gotberg, Lathrup Village, and Benedict Welte, Lake Orion, Mich., assignors to Colonial Broach & Machine Company, Detroit, Mich., a corporation of Delaware Application March 1, 1957, Serial No. 643,450

5 Claims. (Cl. 90—33)

This invention relates generally to broaching machines and more particularly to a broaching machine which is capable of acting on a workpiece under circumstances wherein only a limited broaching movement is possible.

In the manufacture of extremely large parts such as steam turbine shafts, for example, which may have a diameter of up to one hundred inches and a length of fifteen feet or more, a single piece of material is formed with a plurality of spaced disc portions extended radially of the shaft. In some cases, one of these disc portions may be of a smaller diameter than the disc portions on opposite sides thereof may also be positioned fairly close to the smaller disc. Accordingly, in forming grooves in the peripheral surface of such a small disc, for attaching turbine blades or the like to the shaft, only a limited movement of a broaching tool is permitted because of the limited clearance provided by the larger disc portions. As a result, the broaching machines which are currently in use cannot accomplish the desired broaching operation.

An object of this invention, therefore, is to provide an improved broaching machine.

Another object of this invention is to provide an improved broaching machine which includes a series of broaching tools mounted on a rotatable drum for selective engagement with a workpiece during back and forth movement of the drum so that the total broaching movements of the broaching tools during a complete cycle of the drum is sufficient to form the necessary grooves.

Another object of this invention is to provide a broaching machine in which a broach-carrying drum is separately adjustable in three different directions to provide a desired final relation of the broaching tools on the drum to a workpiece.

Another object of this invention is to provide a broaching machine which includes a broaching tool mounted for limited angular adjustment to provide a desired final path of movement for the tool.

A further object of this invention is to provide a broaching machine which includes a milling head and broaching means mounted on a common support for selective engagement with a workpiece so that the cutter can be used to quickly remove selected portions of the workpiece prior to use of the broaching means.

Still a further object of this invention is to provide a broaching machine which is relatively simple in construction, economical to manufacture and efficient in operation in forming extremely large workpieces of a desired configuration.

Further objects, features and advantages of this invention will become apparent from a consideration of the following description when taken in connection with the accompanying drawing in which:

Fig. 1 is a front elevational view of the broaching machine of this invention, with some parts broken away and other parts shown in section for the purpose of clarity;

Fig. 2 is a top plan view of the broaching machine of this invention, likewise with some parts broken away;

Fig. 3 is a fragmentary sectional view illustrating the broaching drum and tool assembly in the broaching machine of this invention;

Fig. 4 is a transverse sectional view looking substantially along the line 4—4 in Fig. 3;

Fig. 5 is a transverse sectional view of the broaching machine of this invention;

Fig. 6 is an enlarged fragmentary elevational view of one of the hydraulic piston and cylinder assemblies in the broaching machine of this invention, with some parts broken away and other parts shown in section for the purpose of clarity;

Fig. 7 is a fragmentary enlarged view looking along the line 7—7 in Fig. 5;

Fig. 8 is fragmentary horizontal sectional view as seen along the line 8—8 in Fig. 7;

Fig. 9 is a reduced transverse sectional view looking along the line 9—9 in Fig. 6; and Fig. 10 is a transverse sectional view of the broaching drum showing the operative relation of the drum and the workpiece.

With reference to the drawing, the broaching machine of this invention, indicated generally at 20, is illustrated in Fig. 1 as including a horizontal base structure 22 secured to a floor or other concrete structure 24 by bolt assemblies, one of which is indicated at 26. Mounted on the base 22 are three relatively movable frames (Fig. 5), namely, a frame 28 movable transversely of the base 22, a frame 30 movable longitudinally of the base 22, and a frame 32 mounted for rotation about an axis extended transversely of the base 22. The above three frames are hereinafter referred to as the transverse frame 28, the longitudinal frame 30, and the pivoted frame 32, for convenience of description. For facilitating the orientation of the machine parts, a workpiece to be broached is illustrated in dotted lines at 34 in Figs. 2 and 5 arranged adjacent what is hereinafter referred to as the front of the machine 20. A milling machine 36 and a broaching drum and tool assembly 38 are movably mounted on the frame 32 for engagement with the workpiece 34, as illustrated in Figs. 1, 2 and 5.

The frames

The transverse frame 28 is illustrated in Fig. 5 as being of a hollow substantially rectangular construction, having a lower plate portion 40 slidably mounted in a guideway 42 (Fig. 2) carried on the base 22. A pair of hold-down members 43 at opposite ends of the frame 28 also function to define the path of movement of the frame 28. Associated with the frame 28 are eight adjustable eccentric roller assemblies 44 (Fig. 2) of well known construction and illustrated in Patent No. 2,608,449. The adjustable roller assemblies 44 compensate for static friction and facilitate movement of transverse frame 28 across the base 22.

At its lower end, the frame 28 carries a pair of upright plates 46 which are arranged in a spaced relation with an upright front portion 47 of the frame 28 for a purpose to appear later. At its upper end, the frame 28 includes an upwardly extended leg 48, also for a purpose to appear later.

For moving the frame 28 transversely of the base 22, a hydraulic piston and cylinder assembly, indicated generally at 50, is secured to the base 22 at a position within an opening 51 in the bottom frame member 40 by means of a key 52 (Figs. 5 and 6). As best appears in Figs. 6 and 9, the assembly 50 includes a horizontal base plate 54 which supports an elongated piston rod 56 arranged above and parallel to the base plate 54 and extended through one end 58 of a cylinder 60. Oppositely disposed guideways 61 (Fig. 9) formed in a pair of upright plate structures 63 arranged on opposite sides of cylinder 60 provide a sliding support for a pair of runner members 65 carried by and projected radially outwardly from the cylinder 60.

The piston rod 56 carries a piston 62 slidably supported within the cylinder 60 and positioned adjacent the opposite end 64 thereof. The cylinder end 64 carries a stem 66 extended axially of the cylinder 60 and terminating in an enlarged head 68. The head 68 is positioned within a tubular cap 70 secured by bolts 72 to the upright front portion 47 of the frame 28. The head 68 is of a rounded construction for cooperation with a similarly rounded bearing plate 71 to insure a uniform distribution of force against the frame portion 47 during movement of the frame 28 in one direction.

The usual fluid motor 73 and hand wheel 74 are associated with a valve assembly 76 carried by the cylinder 60, with the motor 73 being mounted on a plate 67 carried by upwardly converged frame members 69 carried on the plate structures 63. Passages 78 and 80 communicate the valve assembly 76 with the cylinder 60 on opposite sides of the piston 62. On operation of the valve 76 to admit fluid under pressure through the passage 78, the cylinder 60 is moved in a direction toward the left as viewed in Fig. 6, with the runner members 65 sliding in the guideways 61, to in turn move the head 68 against the annular end 81 of the cap 70 to move the frame 28 to the left. On the other hand, when the valve assembly 76 is operated to admit fluid under pressure through the passage 80, the cylinder 60 is moved toward the right to in turn move the head 68 against the bearing plate 71 and move the frame 28 toward the right. During initial adjustment of the frame 28, the motor 73 is utilized since the frame 28 is being moved relatively large distances, with the hand wheel 74 being used for fine adjustments of the position of the frame 28.

Positioned on the front side of the transverse frame 28 is the longitudinal frame 30 which includes a generally horizontal portion 84 and a generally upright portion 86. The lower horizontal portion 84 is slidably supported on a Formica pad 86a carried on the base 22 and terminates at its outer end in an upwardly extended multi-piece leg indicated generally at 88. The leg 88 in turn terminates at its upper end in a cradle member 90 which has a concave upper surface 92 (Fig. 1). A wedge member 94 adjustably supports the cradle member 90, with a bolt 96 being operable on adjustment to move the wedge 94 in or out to raise or lower the cradle member 90. As will more clearly appear hereinafter, the cradle member 90 functions as an outboard support for the pivoted frame 32.

A downwardly extended leg 98 formed on the upright portion 86 of the frame 30, adjacent its juncture with the horizontal portion 84, is positioned between the portion 47 of the frame 28 and the plates 46 for interlocking the frame 30 with the frame 28 and providing a guideway, extending longitudinally of the base 22 for supporting the longitudinal frame 30. Likewise, at its upper end, the frame 30 includes a pair of transversely spaced portions 100 arranged on opposite sides of the upwardly extended portion 48 of the frame 28 for providing a second guided support of the frame 30 on the frame 28 thus insuring an interlocking of the frames 28 and 30.

It can thus be seen that on operation of the hydraulic assembly 50 to move the frame 28 transversely of the base 22, the frame 30 is concurrently moved transversely of the base 22 with the leg 88 sliding on the Formica pad 86. For moving the frame 30 longitudinally of the base 22, a hydraulic cylinder and piston assembly 102 (Fig. 2), identical with the assembly 50 previously described, is mounted on the frame 28 and connected at 103 to the frame 30 (Fig. 2). On actuation of the assembly 102 the frame 30 slides longitudinally of the base 22, with the engaged upper and lower portions of the frames 28 and 30 providing for a guided support of the frame 30 on the frame 28.

The pivoted frame 32 includes an outer or front L-shaped portion 104 (Fig. 5) and an inner tubular portion 106. The outer portion 104 is provided with a supporting shoe 108, which rests on the cradle member 90 as illustrated in Figs. 1 and 2. The shoe 108 has a convex lower surface 109 which is of a curvature corresponding to the curvature of the upper concave surface 92 of the cradle member 90 so that the shoe 108 is readily rockable on the cradle member 90. The nesting surfaces 92 and 109 are positioned on an arc having a center corresponding to the axis 154 of the tubular frame portion 106.

The inner tubular portion 106 of the frame 32 is rotatably supported on a tubular extension 10 of the longitudinal frame 30 concentrically arranged within a rearwardly extended tubular frame portion 113, and is provided with a rearwardly extending reduced extension 107. A lever 114 projects upwardly through an opening 116 in the upper end of the frame 28 and has a hub 112 mounted on the outer end of the tubular extension 107. A stem 118 extends through the hub 112 and is threadably connected to a plate or disc 120 secured to the outer end of the tubular extension 107. On rotation of the stem 118, which is slidably supported at its outer end in a guideway 122 (Figs. 5 and 7) formed in the frame 28, an upright plate 124, which forms a part of the frame portion 104 and is connected to the portion 106, is moved against the front side of the portion 86 of the frame 30. In addition an annular disc 126 carried by the tubular extension 107 is moved against the opposite side of the frame 30 at the rear end of the tubular portion 110. As a result, the portion 86 of the frame 30 is clamped between opposite portions of the frame 32 to prevent transverse shifting of the pivoted frame 32 relative to the frame 30.

A hydraulic piston and cylinder assembly 128, like the assembly 50 previously described, is carried on one of the portions 100 of the frame 30 and connected to the lever 114 for rocking the frame 32. On operation of the assembly 128, the frame 32 may be rocked in either direction on bearings 130 carried by the tubular extension 110. During rocking, the shoe surface 109 slides on the correspondingly curved surface 92 of the outboard supporting cradle 90. During operation of the assembly 102 (Fig. 1) to adjust the longitudinal frame 30, the tubular portions 110 and 106 of the frames 30 and 32, respectively, move within an opening bounded by a horizontally elongated curved frame member 111 carried by the transverse frame 28 (Fig. 7).

*The milling machine and broach assembly*

Slidably mounted on the horizontal portion 104 of the pivoted frame 32 is an L-shaped frame 131 (Fig. 5) having a horizontal leg 134 and an upright leg 136. The terminal end of the leg 134 is supported on a Formica pad 138 and is guidably received within a guideway 141 formed on the frame 32. The upper end of the leg 136 is similarly received in a guideway 138 formed on the pivoted frame 32 and an L-shape Formica pad 140 supports the slide frame 131 at the juncture of the legs 134 and 136.

The milling machine 36 includes a base 142 fixed on the frame leg 134 and provided with an upright undercut guide rail 144. The machine 36 also includes a spindle 148 projected downwardly below a spindle housing 149 carried on an upright frame 151. Removably mounted on the lower end of the spindle 148 is a milling cutter 146. The spindle 148 is driven by a motor 150 supported on a gear box 150a, and is movable up and down to adjusted positions in response to operation of a hand wheel 158. As will more clearly appear hereinafter, the hand wheel 158 is manipulated to initially adjust the position of the cutter 146 so that it is centered with respect to the axis 154 of rotation of the pivoted frame 32. A hydraulic piston and cylinder assembly 156 (Fig. 1) has a piston rod 152 connected to the base 142 and a cylinder 159 provided with a foot 161 connected to the frame 151. On actuation, the assembly 156 is operable to move the cutter 146 longitudinally of the base 142 between stop positions defined by the engagement of adjustable stop nuts 155 with opposite sides of stop members 157. The nuts 155 are carried on corresponding threaded rods 155a mounted on the frame 151 and the members 157 are secured to the base 142. A hand wheel 160 operates a screw (not shown) to move the spindle 148 in a direction transversely of the base 22 with a spindle supporting member 162 riding in a guide 164 during operation of the hand wheel 160 to move the cutter 146 toward and away from the workpiece 34.

A hydraulic piston and cylinder assembly 170 (Figs. 1 and 5) mounted on an upright supporting bracket 172 carried by the pivoted frame 32 has a cylinder 174 and a piston rod 176 connected at 178 to the slide frame 131. While the axis 175 of the cylinder 174 is illustrated as extending through the axis 154 of rotation of the pivoted frame 32, such an arrangement is not required for the operation of the machine 20.

On operation of the hydraulic cylinder assembly 170 to extend and retract the piston rod 176, the slide frame 131 is movable in back and forth directions longitudinally of the base 22 at speeds required for a broaching operation.

The broach assembly 38 includes a broaching drum 180 (Fig. 3) secured at opposite ends, by bolts 182 and 184, to a stub shaft 187 and an elongated shaft 186, respectively. The shaft 187 is supported in a bearing 188 and the shaft 186, which is of irregular cross section, is journaled on bearings 190 and 191. The bearings 188 and 190 are carried by a pair of upright plates 192 maintained in a predetermined spaced relation by bolts 194.

A series of broaching tools 196, extended longitudinally of the drum 180 in a direction parallel to the drum axis are mounted at evenly spaced positions about the periphery of the drum 180. The tools 196 are removably mounted on the drum 180 in a conventional manner (not shown) for ready removal or replacement. In the illustrated embodiment of the invention, six broaching tools 196 are mounted on the drum 180, with the tools being arranged in a uniformly spaced relation.

Secured to the shaft 186, at a position outwardly of one end of the drum 196, and within a housing 197 which is secured to one of the plates 192, is an index disc 198 having twelve equally spaced notches 200 formed in the periphery thereof. An arm 202 arranged adjacent the disc 198 is connected through a conventional one-way clutch 204 to the shaft 186. The arm 202 is connected to the lower end of a plunger 206 operated by a hydraulic mechanism 208 arranged above the disc 198. On downward movement of the plunger 206, the arm 202 is rotated in a counterclockwise direction to thus rotate the shaft 186 and the disc 198 in the same direction, indicated by the arrow "A" in Fig. 4, an angular distance corresponding to the angular distance between adjacent notches 200.

At the conclusion of such rotation, a notch 200 is aligned with a shot pin 210 carried by the upper end of the housing 197 and movable in response to actuation of an operating mechanism 212 in a timed relation with the operation of the plunger 206. The shot pin 210 thus holds the disc 200 in a fixed position during return of the plunger 206 to an upper position. During this return, the inclusion of the one-way clutch 204 prevents any rotation of the shaft 186. The plunger 206 and the shot pin 210 thus coact in a predetermined manner to provide for an indexing of the drum 180 in increments corresponding to half the distance between the tools 196.

During a broaching operation, the broaching drum is moved in a direction axially thereof in response to operation of the hydraulic cylinder assembly 170 to move the slide frame 131 longitudinally of the machine base 22. On movement of the drum 180 in one direction, a work stroke is accomplished for one of the broaching tools 196. At the conclusion of this work stroke, the plunger 206 operates in response to a signal from a controlling electric circuit (not shown) to move the index disc 198 and the shaft 186 through an angular distance corresponding to half the distance between the broaching tools 196. Immediately prior to downward movement of the plunger 206, of course, the actuating mechanism 212 lifts the shot pin 210 so that the pin does not interfere with rotation of the disc 198. While the controlling electrical circuit has not been illustrated, it is apparent that such circuit is of conventional nature and includes a series of cams 214 on one end of the shaft 186, the usual limit switches, such as the switch shown at 115, which are operable in response to movement of the drum 180 to limit positions, and a light 216 for visually indicating the station number in which the drum is located.

The hydraulic cylinder assembly 170 is then automatically operated to reverse, the direction of the movement of the slide frame 131 so that the broaching tools 196 are moved in a return direction. Since the portion of the drum 180 between a pair of adjacent tools 196 is opposite the portion of the workpiece across which one of the tools 196 has just travelled, it is apparent that no work will be performed during the return stroke. When the drum 180 has been fully returned, the indexing mechanism is again operated automatically to provide for the retraction of the shot pin 120, downward movement of the plunger 206 to index the drum 180, and downward movement of the shot pin 210 to a locking position, followed by return of the plunger 206 to a withdrawn position in which it is set for performing the next indexing operation.

In most broaching operations, the six tools 196 are of a progressively enlarged size so that each tool acts to progressively enlarge the slot previously formed in the workpiece 34 by the milling cutter 146. Consequently, when the drum 180 has been indexed through a complete revolution, the desired broaching operation has been completed. In the event a further enlargement of the resulting slot in the workpiece 34 is required, the six broaching tools 196 on the drum 180 are merely replaced by a larger set of six tools.

*Operation*

In the operation of the machine 20, the workpiece indicated diagrammatically at 34 in Fig. 5 and which may be a disc portion having a diameter of, for example, one hundred inches on a one-piece turbine shaft of, for example, fifteen feet in length, is moved to a fixed position relative to the machine 20. The workpiece 34 is mounted for rotation about its own axis in a position extended longitudinally of and parallel to the direction of movement of the longitudinal frame 30 in the machine 20. The workpiece 34 is also initially arranged in a position in which a horizontal plane intersecting the axis of the workpiece 34 and indicated at 220 in Fig. 5 coincides with the axis of rotation 154 for the pivoted frame 32. An upright arm 222 removably secured to the leg 104 of the pivoted frame 32, by means of bolts 224, includes a plug 226 extended toward the workpiece 34 and aligned with the axis 154. The plug 226 thus readily indicates the location of the axis 154 to facilitate the positioning of the workpiece 34. As shown in Fig. 2, the workpiece 34 is positioned such that the center of the portion to be slotted coincides with the axis 154.

After the workpiece has been thus located in a fixed position relative to the machine 20, the arm 222 is removed and the hydraulic cylinder assembly 50 is operated to move the frame 28 in a direction providing for an advancement of the cutter 146 toward the workpiece 34. Of course, when the frame 28 is moved toward the workpiece 34, the frame 30 is also moved by virtue of its guided connection at the upper and lower ends thereof to the frame 28. The frame 32 is likewise moved since it is carried by the frame 30. The hand wheel 74 for the assembly 50 is utilized to advance the cutter 146 to about the position required for the desired depth of the first cut of the wheel 146. The hand wheel 160 is rotated to position the cutter 146 in the precise position desired. The longitudinal frame 30 is moved longitudinally of the base 22, on operation of the hydraulic assembly 102, to position the cutter 146 adjacent the workpiece 34.

As previously described, one of the primary uses of the broaching machine 20 is the forming of grooves or slots in the disc portions of turbine shafts so that the turbine blades can be mounted on the shaft. In many cases, these blades are to be inclined relative to the axis of the shaft. Thus, for such cases, the hydraulic assembly 128 is operated to move the actuating lever 114 for the frame 32 to rotate the frame 32 about the axis 154 an angular distance corresponding to the desired angle of inclination of the turbine blades. By virtue of the location of the milling cutter 146 in a centered relation with the axis 154, the predetermined relation of the cutter 146 with the workpiece 34 is insured. In other words, once the cutter 146 has been properly inclined the position of the frame 30 is adjustable to locate the cutter 146 in a position for grooving the desired portion of the workpiece. A similar result is obtained by centering the broaching drum 180 relative to the axis 154 and initially locating the tools 196 so that each tool in engagement with the workpiece follows the path of the cutter 146. Thus, by virtue of the location of the cutter 146 and the broaching drum 180 at centered positions relative to the axis 154, a proper positioning of the turbine blade mounting grooves in the workpiece 34 is insured.

After the frames 28, 30 and 32 have been thus adjusted to the desired positions relative to the workpiece 34, a series of upright bolts 232 (Fig. 2) carried by the base 22 and extended through corresponding slots 234 in the transverse frame 28 are tightened to hold the frame 28 in its adjusted position on the base 22. Likewise, bolts 236 (Fig. 1) carried by the longitudinal frame 30 are tightened in their corresponding slots 238 formed in the plates 46 for the transverse frame 28 for holding the longitudinal frame 30 in a predetermined adjusted position relative to the frame 28.

A series of bolts 240 (Fig. 1) extend through inclined slots 242 formed in upright ears 244 carried by the pivoted frame 32. Each bolt 240 is movable into any one of a plurality of threaded openings 246 formed in the frame 30 at positions extended in an arc about the axis 154. As a result, the pivoted frame 32 is angularly adjusted while the bolts 240 are removed, with the bolts 240 being assembled in an appropriate opening 246 and tightened against the ears 244 to maintain the pivoted frame 32 in an angularly adjusted position relative to the longitudinal frame 30.

With the frames 28, 30 and 32 thus maintained in positions corresponding to the desired position of the cutter 146 relative to the workpiece 34, the milling machine 36 is operated as previously described to move the cutter 146 longitudinally of the base 22 to cut grooves in the workpiece 34. Whenever a cutter 146 is removed and a second cutter 146 substituted therefor, the hand wheel 152 is manipulated to center the cutter 146 relative to the axis 154. The milling machine 36 is operated automatically by a control circuit (not shown) to form the desired grooves. Following the forming of each groove by the cutter 146, the workpiece 34 is rotated to position another portion thereof opposite the cutter 146 until the desired number of grooves has been formed.

After the desired portions of the workpiece 34 have been removed, by means of the milling machine 36, the hydraulic cylinder assembly 170 for the broach assembly 38 is operated to move the slide frame 131 and the broaching tools 196 carried thereby across the workpiece 34 at the grooves formed by the milling cutter 146 to thus form grooves in the workpiece 34 of the desired size and configuration.

From the above description it is seen that this invention provides a broaching machine 20 which includes both a milling machine 36 and a broach assembly 38. As a result, the milling machine 36 is readily operated to remove material from the workpiece 34 at a rapid rate, with the broach assembly 38 following up the milling machine operation to form the grooves in the workpiece 34 of the required size and configuration. By virtue of the mounting of the slide frame 131, which carries both the milling machine 36 and the broach assembly 38, for movement both longitudinally and transversely of the workpiece 34 as well as for up and down pivotal movement, the workpiece 34 can be maintained in a substantially fixed position during the forming of inclined grooves therein. Accordingly, the expense involved in moving a workpiece as large and heavy as the workpiece 34 is avoided. Furthermore, the centered arrangement of the cutter 146 and the broaching drum 180 relative to the axis 154 provides for a quick and accurate adjustment of the machine to form the inclined grooves.

Although the invention has been described with respect to a preferred embodiment thereof, it is to be understood that it is not to be so limited, since changes can be made therein which are within the scope of the invention as defined by the appended claims.

What is claimed is:

1. In a broaching machine which includes a substantially horizontal base, a frame pivotally mounted on said base for up and down adjustable movement, means on the base for adjusting the position of the frame longitudinally and transversely of the base, a slide frame slidably mounted on said pivoted frame for movement back and forth in directions longitudinally of said base, a plurality of broaching tools mounted on said slide frame for movement along a straight line path arranged in an intersecting relation with the axis of rotation of said pivoted frame, motor means mounted on said pivoted frame for moving said slide frame, and means for operating said motor means to move said slide frame.

2. In a broaching machine which includes a base and a frame mounted on said base for back and forth sliding movement in one direction, means supporting said frame on said base for rotatable movement about an axis extending transversely of said one direction, a drum mounted on said frame for rotatable movement relative thereto, a plurality of substantially parallel broaching tools mounted on said drum and extended longitudinally thereof in said one direction, means for moving said frame in said one direction to accomplish a working stroke of said tools and in an opposite direction to return said tools, said tools being arranged so that on a working stroke a tool is moved along a path which intersects said axis, index means operatively associated with said drum for rotating the drum in one direction through an angle corresponding to one-half the angular distance between adjacent tools at the end of a working stroke, and means for rotating said drum in the same direction and through the same angle at the end of the return stroke.

3. In a broaching machine which includes a base adapted to be arranged adjacent a workpiece, frame means supported on said base for pivotal movement about a substantially horizontal axis intersecting said workpiece to inclined positions relative to said workpiece, a slide frame movably mounted on said pivoted frame for translatory movement relative to said workpiece at an inclination corresponding to the inclination of said frame means, and means mounted on said slide frame for translatory movement along a plane which intersects said axis into working engagement with said workpiece for removing material therefrom, said slide frame being adapted to support rotatable cutter means in a position in which the plane of rotation thereof coincides with said first mentioned plane.

4. In a broaching machine which includes a substantially horizontal base, a first frame movably mounted on said base for sliding movement transversely thereof, a second frame movably mounted on said base for movement longitudinally thereof, means interconnecting said first and second frames to provide for movement of the second frame in response to movement of said first frame, means carried by said base and engaged with said first frame for selectively moving said frame transversely of said base, a third frame mounted on said second frame for up and down pivoted movement relative thereto about a substantially horizontal axis extending transversely of said base, a rotatable drum member mounted on said third frame for translatory movement in a direction longitudinally of said base, with the axis of said drum member being arranged in an intersecting relation with said horizontal axis, and a plurality of broaching tools mounted on and extended longitudinally of said drum.

5. In a broaching machine which includes a substantially horizontal base, a first frame pivotally mounted on said base for rotational movement about a substantially horizontal axis, a second frame slidably mounted on said first frame for movement back and forth in directions longitudinally of said base, a broach drum mounted on said second frame and arranged so that the axis thereof is parallel to said directions and intersects said horizontal axis, hydraulic cylinder means mounted on said pivoted frame for moving said slide frame, and means for operating said cylinder means to move said second frame.

References Cited in the file of this patent

UNITED STATES PATENTS

| | | |
|---|---|---|
| 822,985 | Robinson | June 12, 1906 |
| 1,660,813 | Perkins et al. | Feb. 28, 1928 |
| 2,072,563 | Lynch | Mar. 2, 1937 |
| 2,108,823 | Lyon | Feb. 22, 1938 |
| 2,198,882 | Monroe | Apr. 30, 1940 |
| 2,412,337 | Jackson | Dec. 10, 1946 |
| 2,556,127 | Walter | June 5, 1951 |